United States Patent
Barenyi

[15] 3,651,886
[45] Mar. 28, 1972

[54] PASSENGER MOTOR VEHICLE
[72] Inventor: Bela Barenyi, Maichingen, Wurttemberg, Germany
[73] Assignee: Daimler-Berg Aktiengesellschaft, Stuttgart-Unterturkheim, Germany
[22] Filed: Sept. 5, 1969
[21] Appl. No.: 855,508

[30] Foreign Application Priority Data

Sept. 7, 1968 Germany ............. P 17 80 375.7

[52] U.S. Cl. .................... 180/91, 180/89, 180/103, 296/28 K
[51] Int. Cl. .................................... B60r 19/00
[58] Field of Search ............. 180/82, 82.1, 82.2, 89, 91, 180/112, 113; 280/106; 296/28, 28 K

[56] References Cited

UNITED STATES PATENTS 3,162,479  12/1964  Hewitt ......................... 180/1 X
2,678,231  5/1954   Barenyi ........................ 296/28.8
2,757,482  6/1956   Brown et al. .............. 296/28.8 UX
2,941,764  6/1960   Lee, Jr. et al. ................ 244/1 SS
3,431,998  3/1969   Martin ........................... 180/112

Primary Examiner—Benjamin Hersh
Assistant Examiner—John P. Silverstrim
Attorney—Craig, Antonelli & Hill

[57] ABSTRACT

A passenger motor vehicle, in particular of cellular-type construction, in which the junction or connecting places between the center section, itself constructed as rigid as possible, and its end section are so constructed and arranged that intentional, predetermined rupture lines or areas are formed thereby; connecting elements with intentional rupture places may be used for that purpose which become disengaged or disconnected in case of forces of predetermined magnitude acting against the center section of the vehicle in the vehicle transverse direction. The intentional disconnection may be aided or brought about by suitably placed explosive charges, detonated only by transversely directed forces of predetermined magnitude.

7 Claims, 4 Drawing Figures

PATENTED MAR 28 1972  3,651,886

INVENTOR
BELA BARENYI

BY
Craig, Antonelli, Stewart & Hill
ATTORNEYS

PASSENGER MOTOR VEHICLE

The present invention relates to a passenger motor vehicle which is so constructed that it offers to the vehicle passengers as far-reachingly as possible a protection in such accidents in which forces become effective which are directed essentially transversely to the vehicle longitudinal axis.

It is known that in the last few years considerable efforts were made in order to increase the safety of passengers of a motor vehicle in case of an accident.

Thus, for example, the center section of motor vehicles accommodating the passenger space was constructed as form-rigid as possible whereas the front and rear sections were constructed so as to be yielding to impact so that in case of forces occurring during accidents and acting essentially in the vehicle longitudinal direction, a considerable portion of the impact energy was dissipated by a permanent deformation of the front and/or rear section and thus the protection of the vehicle passengers was increased.

Attempts have also been undertaken already in different directions in order to protect the vehicle passengers against forces occurring during accidents which act on the passenger space essentially in the transverse direction, thus, for example, special reinforcements have been built laterally into the body (bearer, threshold, roof rim) and into the vehicle doors whereby, for example, the thickness of the doors was increased considerably. However, no adequate rigidity could be achieved by such measures alone so that such types of attempts have not been satisfactory to date, and even today a particularly strong endangering of the passengers of a motor vehicle occurs in case of lateral impact.

Consequently, the present invention is concerned with the task to create a passenger motor vehicle which offers its passengers an adequate protection also in case of lateral impact.

Accordingly, a passenger motor vehicle which is manufactured in particular of cellular-type construction and which possesses in its center section as form-rigid as possible a passenger space, is proposed in which according to the present invention, intentional, predetermined rupture lines and/or connecting elements with intentional, predetermined rupture places are provided at the joint places between front section and/or rear section, on the one hand, and the center section, on the other, which are destroyed in case of forces of predetermined magnitude acting essentially in the vehicle transverse direction.

It is particularly advantageous if the destruction of the intentional, predetermined rupture places or rupture lines is realized or assisted by explosive charges arranged within the areas thereof.

Preferably, for the detonation of the explosive charges, contacts are provided within the area of the lateral walls, especially within the area of the lateral walls of the center section which are closed only upon exceeding an impact load of a predetermined magnitude and only upon action from a lateral direction. In a particularly advantageous type of construction of the present invention, contact bars or contact strips are used.

Accordingly, it is an object of the present invention to provide a passenger motor vehicle which avoids by simple means the aforementioned shortcomings and drawbacks encountered in the prior art.

Another object of the present invention resides in a passenger motor vehicle which greatly increases the safety of the passengers against injuries in case of laterally directed impacts.

A further object of the present invention resides in a passenger motor vehicle which is so constructed that its end section or sections are at least partly disconnected from the center section accommodating the passengers in case of impacts against the center section from the side of the vehicle.

These and further objects, features and advantages of the present invention will become more obvious from the following description when taken in connection with the accompanying drawing, which shows, for purposes of illustration only, several embodiments in accordance with the present invention, and wherein.

Figure 2:
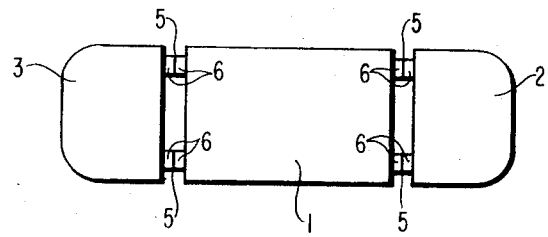
FIG. 2 is a plan view on a schematically illustrated modified embodiment of a passenger motor vehicle of three-cell construction in accordance with the present invention.
Figure 3:
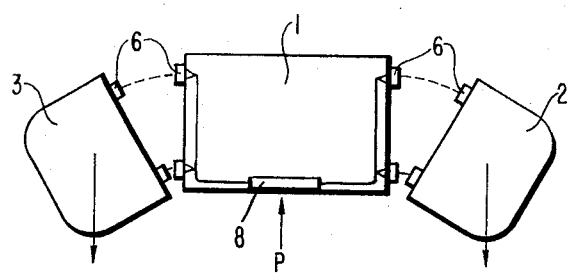
Figure 4:
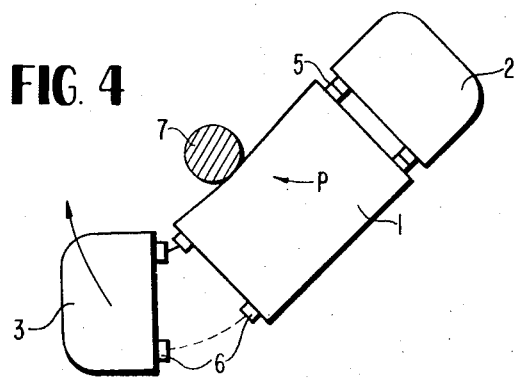

FIG. 3 is a schematic plan view on a passenger motor vehicle according to FIG. 2 under the effect of a force acting approximately in the center of the passenger space and directed in the vehicle transverse direction; and FIG. 4 is a schematic plan view on a passenger motor vehicle of three-cell construction in accordance with the present invention in case of a somewhat eccentric, lateral impact, for example, against a tree.

Figure 1:
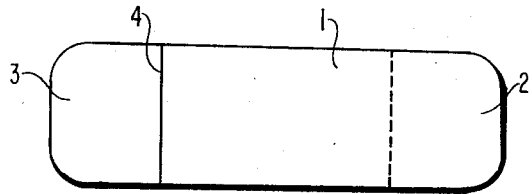
FIG. 1 is a plan view on a schematically illustrated passenger motor vehicle of two-cell construction in accordance with the present invention.

Referring now to the drawing wherein like reference numerals are used throughout the various views to designate like parts and more particularly to FIG. 1, the passenger motor vehicle illustrated schematically in this Figure is of conventional two-cell construction and includes a form-rigid center section 1 as well as a rear section 2 combined into one cell. The other cell is constituted by the front section 3. An intentional, predetermined rupture line 4 extends over the entire vehicle width at the joint place or abutment area between front section 3 and center section 1. This arrangement is particularly advantageous if the front section 3 has a large proportion of the vehicle weight. The intentional, predetermined rupture line 4 is formed conventionally, utilizing conventional means, and therefore not described herein in detail. For example, conventional connecting means may be so arranged and constructed as to form in effect the intentional rupture line 4.

The passenger motor vehicle according to FIG. 2 consists of a center section 1 accommodating the passenger space and constructed conventionally as form-rigid as possible which is adjoined by the rear section 2 and by the front section 3 under the interposition of connecting elements 6 of any conventional construction and provided with intentional rupture places 5. Since such connecting elements 6 are known, per se, in the prior art, a detailed description thereof is dispensed with herein.

The operation of the connecting elements 6 and of the intentional rupture places 5 according to the present invention is illustrated in FIGS. 3 and 4. In case of the accident schematically indicated in FIG. 3, a considerably more easy movement and displacement of the center section 1, which is at least partly disconnected or separated from the front section 3 and the rear section 2, and consequently involving smaller deformations is possible under the influence of the force P acting in the direction of the arrow than would be the case with a complete vehicle, i.e., with a vehicle assembled in the conventional manner.

In the case of the accident schematically illustrated in FIG. 4, a rotation of the vehicle favored, for example, by a unilaterally disconnected front section 3, whereby the affected vehicle becomes lighter in weight, is possible about the obstacle 7 under the influence of the force P acting again in the direction of the arrow.

The disconnection at the international rupture lines or connecting places may be brought about or assisted by conventional explosive charges, suitably housed and protected or at the connecting elements 6 or similar, conventional connecting means forming the intentional rupture lines or places, which are detonated in any conventional manner, for example, electrically by switch means 8 arranged in the lateral walls of the vehicle, especially in the lateral walls of the center section; the switch means thereby become operable, i.e., close only in case of impact of a force of predetermined magnitude and in predetermined directions, i.e., transversely to the vehicle. The switch means may be constructed advantageously as contact bars or strips suitably mounted, for example, in the doors or the like which are prevented from closing the contact by conventional means except in the presence of a lateral force exceeding the predetermined force. Since all these means are known, per se, to a person skilled in the art, a detailed description thereof is dispensed with herein.

The schematic arrangement of the switch means 8 and the connecting elements 6 is shown in FIG. 3. U.S. Pat. Nos. 3,389,607 and 3,286,055 disclose switch means that could be used with this invention.

While I have shown and described only two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A surface type passenger motor vehicle which includes a center section having a passenger space that is as form-rigid as possible and at least one end section connected with the center section, characterized in that connecting means are provided at the junction places between the end section and the center section effectively providing thereat an intentional, predetermined rupture between the two sections, and in that means are provided for destroying said connecting means in response to forces of predetermined magnitude acting on the vehicle essentially in the transverse direction.

2. A passenger motor vehicle according to claim 1, characterized in that the vehicle is of cellular-type construction.

3. A passenger motor vehicle according to claim 1, characterized in that said connecting means provides in effect a predetermined, intentional rupture line upon destruction thereof.

4. A passenger motor vehicle according to claim 3, characterized in that the vehicle includes a front section and a rear section, intentional rupture lines being provided at the junction places between the front and rear sections, on the one hand, and the center section, on the other.

5. A passenger motor vehicle according to claim 1, characterized in that said connecting means provide a plurality of intentional rupture places between the end section and the center section.

6. A passenger motor vehicle according to claim 1, characterized in that the destruction of said connecting means is effected by explosive charge means arranged within the area thereof.

7. A passenger motor vehicle according to claim 1, characterized in that the destruction of the connecting means is assisted by explosive charge means arranged within the area thereof.

* * * * *